United States Patent [19]
Mann et al.

[11] Patent Number: 4,975,904
[45] Date of Patent: Dec. 4, 1990

[54] LOCAL AREA NETWORK FOR DIGITAL DATA PROCESSING SYSTEM INCLUDING TIMER-REGULATED MESSAGE TRANSFER ARRANGEMENT

[75] Inventors: Bruce Mann, Mason; Darrell Duffy, Windham, both of N.H.; Anthony Lauck, Wellesley; William Strecker, Harvard, both of Mass.

[73] Assignee: Digital Equipment Corporation, Maynard, Mass.

[21] Appl. No.: 433,419

[22] Filed: Nov. 7, 1989

Related U.S. Application Data

[63] Continuation of Ser. No. 364,577, Jun. 8, 1989, abandoned, which is a continuation of Ser. No. 177,849, Apr. 4, 1988, abandoned, which is a continuation of Ser. No. 27,033, Mar. 19, 1987, abandoned, which is a continuation of Ser. No. 616,553, Jun. 1, 1984, abandoned.

[51] Int. Cl.$^5$ .............................. H04J 3/02; H04J 3/24
[52] U.S. Cl. .................................... 370/85.1; 370/94.1; 340/825.51; 340/825.52
[58] Field of Search ...................... 370/85.1, 85.2, 85.3, 370/85.4, 85.5, 85.7, 85.8, 85.9, 85.12, 85.13, 85.14, 85.15, 94.1, 94.2, 94.3, 95.1, 95.2, 95.3; 340/825.05, 825.5, 825.51, 825.52

[56] References Cited

U.S. PATENT DOCUMENTS

| | | | |
|---|---|---|---|
| 4,039,737 | 8/1977 | Frisone | 179/15 AL |
| 4,039,757 | 8/1977 | Frisone | 370/82 X |
| 4,063,220 | 12/1977 | Metcalfe et al. | 340/147 LP |
| 4,227,178 | 10/1980 | Gergaud et al. | 340/147 R |
| 4,236,245 | 11/1980 | Freeny et al. | 370/94 |
| 4,292,623 | 9/1981 | Eswaran et al. | 340/825.5 |
| 4,320,502 | 3/1982 | deVeer | 370/85 |
| 4,332,027 | 5/1982 | Malcolm et al. | 370/94 |
| 4,379,294 | 4/1983 | Sutherland et al. | 340/825.5 |
| 4,385,382 | 5/1983 | Goss et al. | 370/96 |
| 4,410,889 | 10/1983 | Bryant et al. | 370/82 X |
| 4,592,048 | 5/1986 | Beckner et al. | 370/60 |
| 4,596,010 | 5/1986 | Beckner et al. | 370/60 |
| 4,663,756 | 5/1987 | Retterath | 370/85 |

FOREIGN PATENT DOCUMENTS 0081056 10/1982 European Pat. Off. .
0160263 4/1985 European Pat. Off. .

OTHER PUBLICATIONS

Product Literature, Net/One Local Area Network Communications System, Ungermann-Bass Inc., with attached price lists dated May 1, 1983.
Net/One Asynchronous Communications Service Reference Manual, Oct. 1983, Ungermann-Bass Inc.
(List continued on next page.)

Primary Examiner—Douglas W. Olms
Assistant Examiner—Wellington Chin
Attorney, Agent, or Firm—John G. Mesaros; Albert Sidney Johnston; Ronald E. Myrick

[57] ABSTRACT

A local area network for interconnecting terminals and other users and data processing systems and other service providers over a communications link by means of interface units each of which may connect to several users or providers. The interface units communicate over the communications link by means of messages. When a user requires the use of a service, the interface unit establishes a virtual circuit between it and the interface unit connected to the service provider and a service session which allows the user and the service provider to communicate over the virtual circuit. If several users connected to the one interface unit as the first user require services provided by providers which connected to the same interface unit as the first provider, they communicate in sessions over the same virtual circuits. The session messages are accumulated into single virtual circuit messages that are acknowledged in unison by the receiving interface unit. Each virtual circuit in the user's interface units includes a timer which reset when a message is transmitted over the virtual circuit and a data waiting flag set whenever data is present to be transmitted over the virtual circuit. The interface units are inhibited from transmitting over a virtual circuit unless the timer has timed out and the data waiting flag is set.

22 Claims, 11 Drawing Sheets

OTHER PUBLICATIONS

Net/One Network Monitor and Control Reference Manual, Oct. 1983, Ungermann-Bass Inc.

Net/One Software Configuration Reference Manual, Oct. 1983, Ungermann-Bass Inc.

Bass et al., "Local Network Gives New Flexibility to Distributed Processing", *Electronics*, pp. 114–120 (Sep. 1980), reprinted in Freeman et al., *Tutorial Microcomputer Networks*, IEEE Catalog Number EHO190-9, pp. 214–222 (1981).

Arnold, Net/One Performance Measurements, Ungermann-Bass Inc., Dec. 16, 1981.

Davidson, "Connection-Oriented Protocols of Net-/One", *Local Computer Networks*, North Holland Publishing Company, pp. 319–333, 1982.

Hyde, "The Networked Plans of Mr. Lan", *Electronic Business*, pp. 88–110, Mar. 1, 1985.

"Proposal for Implementation and Evaluation of an Ethernet Terminal Front-End", Carnegie-Mellon University, 15 Jun. 1981.

Tannenbaum, *Computer Networks*, Prentice-Hall, Inc., Englewood Cliffs, N.J., Chapter 8, "The Transport and Session Layers", (1981), Table of Contents for Chapter 8, text of Chapter 8, including pp. 324–385, and Chapter 3, pp. 119–124.

CCITT, Data Communication Networks-Services and Facilities, Terminal Equipment and Interfaces, Recommendation X.1–X.29, published 1981.

Lauck et al., "A Combined Error and Flow Control Algorithm for Dynamic Receive Buffering", Control in Computer Networks, (ed. Grange), pp. 173–187 (1979).

Watson, "Timer-Based Mechanisms in Reliable Transport Protocol Connection Management", *Computer Networks*, pp. 47–56, Feb. 1981.

Palframan et al., "Reliable Interprocess Communication in Distributed Network", *Pathways to the Information Society*, pp. 184–189, Proceedings of the Sixth International Conference on Computer Communication, London (Sep. 1982).

Saal, "Local Area Networks: Possibilities for Personal Computers", *Byte*, vol. 6, No. 10, pp. 92–111 (Oct. 1981), copy from reprint in Freeman, at pp. 3–10.

Stritter et al., "Local Networks of Personal Computers", Proceedings COMPCON, Spring 1981, Feb. 1981, pp. 2–5.

Danthine et al., "Transport Layer—Long-Haul vs Local Network", Local Networks for Computer Communications, pp. 271–296 (1981).

Solnsteff, "A Distributed Operating System for an Educational Network", Proceedings of the 3rd Symposium on Small Sytems, pp. 67–71 (Sep. 1980), copy from reprint in Freeman at pp. 182–186.

Carpenter et al., "A Microprocessor-Based Local Network Node", Proceedings COMPCON, Fall 78, pp. 104–109 (Sep. 1978), copy from reprint in Freeman at pp. 148–153.

Kuhns et al., "A Serial Data Bus System for Local Processing Networks", digest of Papers COMPCON 79, pp. 266–271 (1970), copy from reprint in Thurber et al., *Tutorial Local Computer Networks*, second edition, IEEE catalog number EHO 179-2 (1981), at pp. 190–194.

Mann et al., "Terminal Servers on Ethernet Local Area Networks", *Digital Technical Journal*, pp. 73–87 (Sep. 1986).

IBM Technical Disclosure Bulletin, vol. 23, No. 5, Oct. 1980, pp. 1811–1812, New York, U.S.; J. G. Sams: "Node Processor for Distributed System Control", * Whole document*.

SERVICE DIRECTORY

| NODE | SERVICES | RATING |
|------|----------|--------|
| A | DISK A | |
| B | DISK A | |
| C | PHONE LINES | |
| D | PROC A<br>PROC B<br>TAPE | |
| E | PROC C<br>PROC D<br>TAPE | |

VIRTUAL CIRCUIT
STATE DIAGRAM

SESSION STATE
DIAGRAM

LOCAL AREA NETWORK FOR DIGITAL DATA PROCESSING SYSTEM INCLUDING TIMER-REGULATED MESSAGE TRANSFER ARRANGEMENT

This is a continuation of application Ser. No. 364,577 filed on June 8, 1989, abandoned, which is a continuation of U.S. Ser. No. 177,849 filed on Apr. 4, 1988, abandoned, which is a continuation of U.S. Ser. No. 027,033 filed Mar. 19, 1987, abandoned, which is a continuation of U.S. Ser. No. 616,553 filed June 1, 1984, abandoned.

BACKGROUND OF THE INVENTION

1. Field of the Invention

The invention relates generally to the field of digital data processing systems and more specifically to local area networks in which a plurality of such systems are interconnected to provide distributed processing capabilities to a number of users. In particular the invention provides improvements in message transfer protocols for local area networks to enhance the message transfer capability of the network.

2. Description of the Prior Art

As small and medium-sized computer systems are becoming less expensive and more powerful, a number of them are being interconnected to form networks to ensure that a number of different types of services are available at any time to users having diverse processing needs. Such services may include any of the services which are normally available from such networks, including such as electronic mail (mail storage and forwarding), word processing, accounting, such as payroll or inventory, or data communications over telephone lines or microwave links. Interconnecting systems into a network helps to enhance the availability of services to service users by including a number of service providers in the network and having each provider provide one or more of the services, thus reducing the likelihood that the failure of any one service provider in the network will result in a significant number of services being unavailable to the users at any one time. Indeed, a local network may be arranged so as to have several service providers providing overlapping services, in which case several providers have the ability to provide a particular service if one service provider fails or is saturated with service requests.

Typically in a local area network, the communications in the network take place over one or a limited number of communications links. Examples of such communications links include those defined by well-known DECnet, SNA (System Network Architecture) or X.25 communications protocols using data links such as Ethernet. A number of service users, such as, for example, video terminals controlled by operators, are connected through interface devices known as "terminal servers" to the communcations link. Similarly, the service providers are connected to the communications link through interface devices known as "nodes".

If the operator desires to use a service provided by a unit connected to a node, it may request connection to the node and, through the node, to the unit to have the service provided. Normally, the operator has to know the particular node(s) and unit(s) that provides the desired service. The operator selects a node and unit to provide the service, and causes the terminal server to request service by that node and service provider. The terminal server and the node exchange messages which enable a "virtual circuit" to be established which provides a data transfer mechanism between the operator's terminal and the provider of the service. The virtual circuit essentially extends from the operator's terminal, as the service user, through the terminal server, over the communications link and through the node to the service provider. If a number of users are using the local area network, several virtual circuits may be established over the communications link to provide communications between the users and providers. In addition, if several terminals connected to one terminal server require services from a service provider connected to the same node, separate virtual circuits are normally established between each terminal and service provider providing the required service.

Service data is transmitted in the form of messages through the virtual circuits between the terminals and the service providers. All of the messages are queued by the terminal servers and transmitted over the single communications link. To ensure that the messages are received, units connected in the network re-transmit the message until an acknowledgement from the recipient is received verifying correct receipt. Specifically, the terminal servers and nodes, after they transmit messages through the virtual circuits over the communications links, monitor the communications link for acknowledgements and if no acknowledgement is received within a selected period of time, corrective action is taken. Each message transmitted through a virtual circuit is acknowledged by a separate acknowledgement message through the virtual circuit, even if a series of messages are transmitted between the same terminal server and node through different virtual circuits over the same communications link. Each acknowledgement message must be separately generated, and thus requires that time and facilities be dedicated at the receiving device to the generation of the separate acknowledgement messages. Furthermore, requiring such separate acknowledgement messages could cause the communications link to quickly become unnecessarily burdened.

In current networks, message transfers through virtual circuits over a communications link are initiated either by the occurrence of certain events ("event driven" transmission), such as the presence of data to be transmitted, or by the timing-out of certain timers ("timer-based" transmission). Both the event-driven and timer based message transfer systems incorporate certain assumptions about message traffic through virtual circuits over the communication link. The event driven systems assume that the communications link has sufficient bandwidth, even when it is being heavily used, to ensure that messages can be delivered from the terminal servers to the nodes, the messages can be processed by the service providers, and the responses to the messages can be returned to the terminal servers, all within a maximum tolerable delay period. If the communications link carries too high a level of message traffic, the delays will, however, become unacceptably long. Furthermore, if a unit transmits data every time it receives a few bytes of data from a service user or provider, a significant number of such messages will be composed primarily of virtual circuit identification information, which is necessary to ensure proper identification of the virtual circuit carrying message over the multiplexed communications link, but otherwise serves no purpose.

Timer-based message transmission systems ensure, on the other hand, that every unit connected to the communications link will be able to transmit messages over the link at periodic intervals. These systems ensure that all of the units have relatively uniform access to the communications link. However, such systems also have a number of deficiencies. First, each unit, when its time comes to transmit, transmits messages through its virtual circuits whether or not it has any data to transmit, obviously wasting bandwidth on the communications link. Furthermore, as units are added to the system, the timers of all of the units would have to be adjusted to ensure that all of the units have reasonably equal access to the communications link.

SUMMARY OF THE INVENTION

The invention provides a new local area network message transfer system which has enhanced message throughput between service users and service providers over a communications link in a local area network, while at the same time insuring that all units have a relatively uniform access to the communications link for transferring messages.

In brief summary, the invention provides a local area network over which a plurality of users, such as terminals or printers, communicate with service providers, such as data processing systems, data storage devices such as disk or tape records, or data links such as telephone lines or microwave transmission links. One or more device servers connects directly to a communications link. Each device server is an interface to the communications link for one or more of the users. Similarly, one or more nodes connects to the communications link, and each node is an interface to the communications link for one or more service providers. Periodically, each node transmits a service advertising message over the communication link which includes its identification, the identifications of the services that are provided by the service providers connected to it, and a rating for each of the services. Each device server receives these messages and records them in a service directory. The services available to a user by the service providers in the network may be viewed by the operators from the service directory stored by the device servers.

When an operator desires to use a service in the service directory, it enables the device server to request the service. The device server then selects the particular provider to provide the service based on the ratings in the service directory, and identifies the node through which communications with the service provider can be conducted. If the device server is not then communicating with that node, it and the node establish a virtual circuit through which they transfer messages. In addition, the device server establishes a service session between itself the user whose operator is requesting the service, and the node establishes a service session between itself and the service provider connected to that node which provides the service requested by the user, with the service sessions at the device server and node, respectively, being linked and the identification of the session being known to the unit, that is, the device server or node, at the other end of the virtual circuit. If any other users request services provided by service providers connected to that same node, similar sessions are established for those users by the device served and for the service provider by the nodes, and messages for all such sessions may be transferred through the same virtual circuit multiplexed in slots in the same virtual circuit message which serves all of the service users or providers. Therefore, the device server need not establish a new virtual circuit for every device which requires the service provided by a service provider connected to that node. Furthermore, only the virtual circuit messages are acknowledged, rather than the individual messages between service users and providers, thereby reducing the number of acknowledgement messages transferred and the resources at the device servers, and nodes required to generate the acknowledgement messages.

Generally, message transfers between a device server and a node through a virtual circuit are initiated by a device server, and each message from a device server to a node is acknowledged by a message from the node. Each message includes a response requested flag which may be set or cleared by the node. The response requested flag is set if the message includes session slot data, otherwise the flag is cleared. The portion of each virtual circuit in the device server includes a server circuit timer and a data waiting flag (DWF) which is set either by the receipt of a message from the node having a set response requested flag or in response to the receipt of slot data from the service users which use the virtual circuit. Normally, the node will send a message only in response to a message from the device server; however, if the response requested flag in the prior message was cleared, which occurs if the node did not send any data in the prior message, the node may send another message to the device server which includes data before it receives a subsequent message from the device server. When a device server transmits a message through the virtual circuit over the communications link, the server circuit timer, pre-set to a selected value, begins to decrement. When the server circuit timer times out and if the data waiting flag is set, the device server transmits a message through the virtual circuit. Until the server circuit timer times out, the device server is inhibited from transmitting a new message over the virtual circuit. Furthermore, the data waiting flag inhibits the device server from transmitting any messages until the data waiting flag is set, indicating it has received a message from the node in which the response requested flag is set or that is has new slot data from the service users to send.

The response requested flag allows the node to immediately acknowledge a message received from the device server, whether or not it has data to send immediately, and to reserve for itself the ability to transmit a second message which has data if no data is sent in the initial message, which second message can be sent even if it receives no intervening message from the device server. The response requested flag in conjunction with the data waiting flag allows the node to force the device server to acknowledge a message that includes data when the server circuit timer next times out, whether or not the device server has data to send. The server circuit timer establishes a minimum delay period after the device server transmits a message before it transmits a subsequent message, thereby allowing other device servers to transmit messages through virtual circuits which they have established over the communications link. The device server and the node thus have the benefit of both a timer based system, based on the server circuit timer, and an event driven system, based on the response requested and data waiting flags.

BRIEF DESCRIPTION OF THE DRAWINGS

This invention is pointed out with particularity in the appended claims. The above and further advantages of this invention may be better understood by referring to the following detailed description taken in conjunction with the accompanying drawings in which:

DETAILED DESCRIPTION OF AN ILLUSTRATIVE EMBODIMENT

Figure 1:
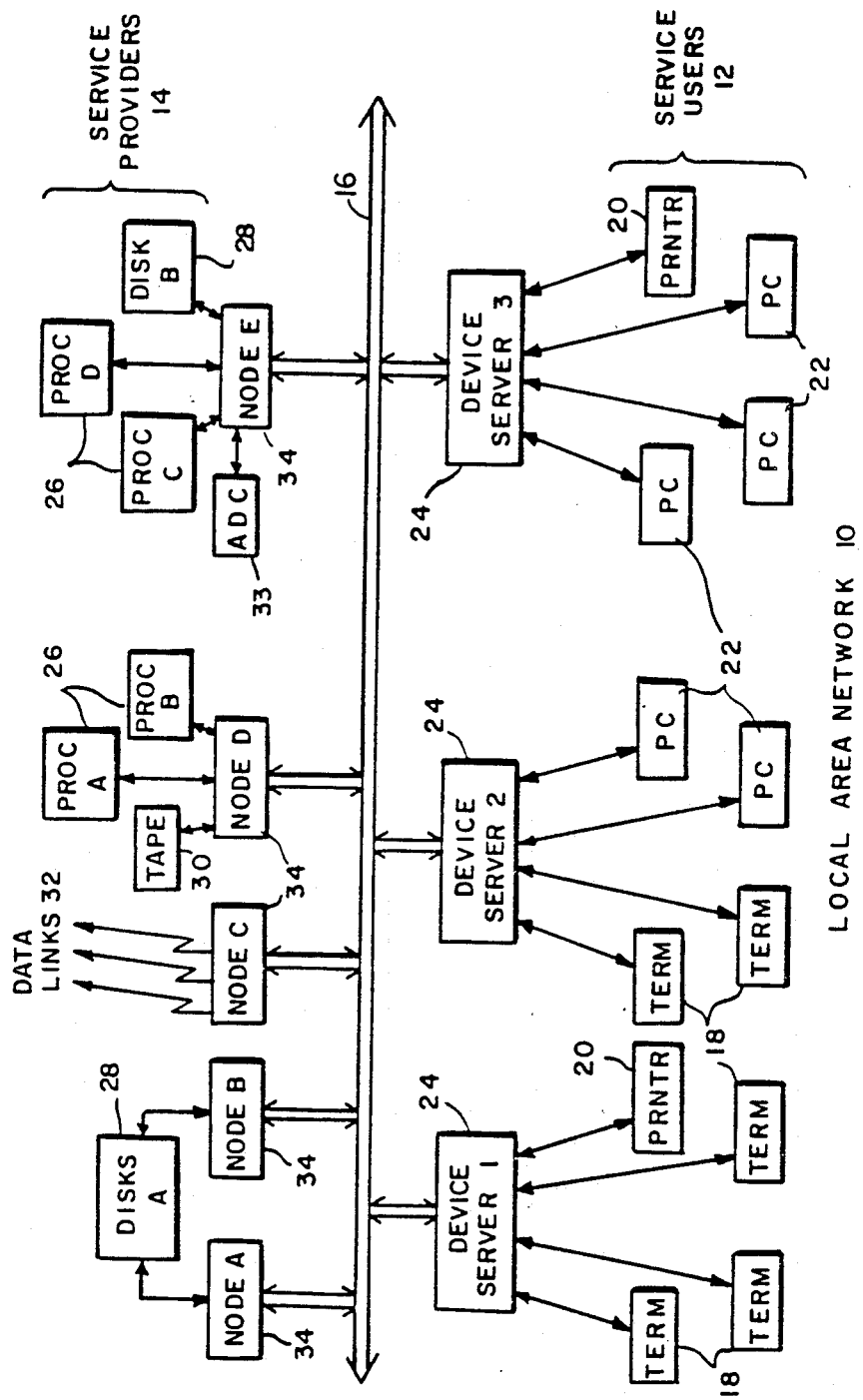
FIG. 1 is a general block diagram of a local area network constructed in accordance with this invention.

FIG. 1 illustrates a local area network 10 in which a plurality of service users, generally indicated by reference numeral 12, communicate with a plurality of service providers, generally indicated by reference numeral 14, over a common communications link 16. A communications link 16 may take the form of any one of a number of communications lines and interface circuitry which transfer data between the service users and service providers in bit serial or parallel form. For example, the communications link may take the form of a coaxial cable and interface circuitry which transmits messages using the well-known Ethernet local area network protocol. In that protocol, data is organized into messages having a predetermined format and transmitted in bit serial form between stations over the coaxial cable. A number of other communications links using diverse protocols exist which could also be used in the local area network depicted in FIG. 1; the specific communications link selected is not an aspect of the invention.

The service users 12 may include a plurality of devices such as, for example, video display terminals 18, printers 20, and personal computers 22. Network 10 also includes a plurality of device servers 24 each of which may connect to several service users and enable the service users to communicate over communications link 16 with the service providers 14. The service providers 14 may include devices such as processors 26, disk drives 28, tape storage units 30 and data links 32 (such as telephone lines or microwave links) and analog-to-digital converters 33. Network 10 also includes a plurality of nodes 34, each of which may be connected to several service providers. Furthermore, each node 34 connects directly to communications link 16 and provides communications between the service providers connected to it and the communications link. It will be appreciated that in some cases a service provider and node may be integrated into one unit that performs both functions.

The service providers 14 provides service to the service users 12. Such services may include, for example, electronic mail storage and forwarding among service users, word processing capabilities, access to programs such as payroll accounting, inventory control or the like, the ability to store or retrieve records on or from disk and tape files, the ability to communicate over telephone lines and microwave links, and the ability to acquire data from, for example, scientific instruments through analog-to-digital converters 33. Such services, as well as additional services, are well known in the art and will not be discussed further herein.

It will be appreciated by those skilled in the art that some service users may also provide services. For example, certain personal computers 22 in network 10, in addition to being a service user, may also have programs that may be accessed and used by another user, such as a terminal 18. In that case, the personal computer may be connected to a node 34 as well as to a device server 24 to make its programs available to a service user as services. A unit which interfaces the personal computer to the communications link may provide the facilities of both a node and a device server.

Figures 2A, 2B:
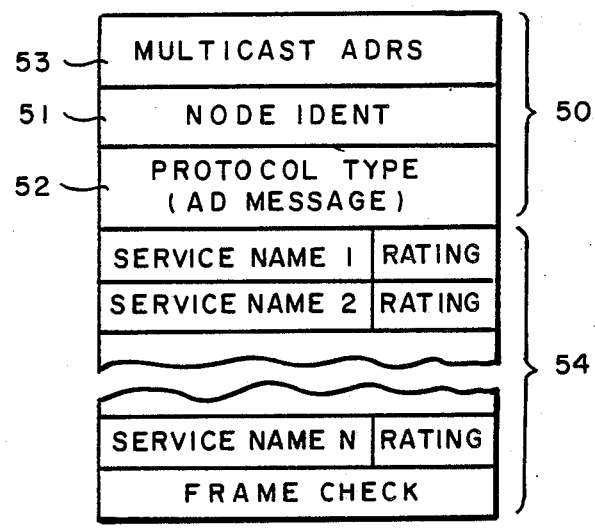
FIG. 2A is a diagram illustrating the contents of a service advertising message transmitted by the service providers in the network depicted in FIG. 1.
FIG. 2B is a diagram of a data base established by the service users in the network of FIG. 1 in response to the service advertising message depicted in FIG. 2A.

Periodically, each node 34 transmits an "advertising" message which is received by all of the device servers 24, which identifies itself and the services provided by the service providers 14 connected to that node, as well as a "rating" for each service. With reference to FIG. 2A, the service advertising message includes a plurality of fields including a header 50, the contents of which depends on the protocol used over a communications line 16, and a body 54. In one embodiment, the header 50 has a node identification field 51 which identifies the transmitting node, a protocol type field 52 identifying the message as the service advertising message, and a multi-cast address field 53 which enables all of the device servers 24 to receive the message. Following the header 50, the node transmits the body 54 of the message which identifies the various services provided by it and the rating for each service. The ratings indicate, for example, how prompt the service provider 14 may be in responding to a service request, based in part on the number of service users 12 then using the service provided by the specific provider and, thus, the potential delay in responding to communications from another service user who might request the service.

After receiving service advertising messages from the nodes 34, each device server 24 (FIG. 1) establishes a service directory such as depicted in FIG. 2B. The directory comprises a table in which the node identifications, the services provided by the nodes, and the service ratings are stored. Thus, if an operator at a service user 12 desires to use one of the services shown in the directory, the device server can use the contents of the service directory depicted in FIG. 2B to determine which nodes provide that service. If more than one node provides the service requested, the device server uses the rating in the rating fields to determine which node has the highest rating for the service and requests that node to provide the service.

The diverse services that are available from the service providers may be divided into groups or classes and each user may be able to access only those services that are of interest to him. The service names may be organized into groups identified by group names, and the device server will display only those services to a particular user which are in the groups which the user can access.

Figure 3A:
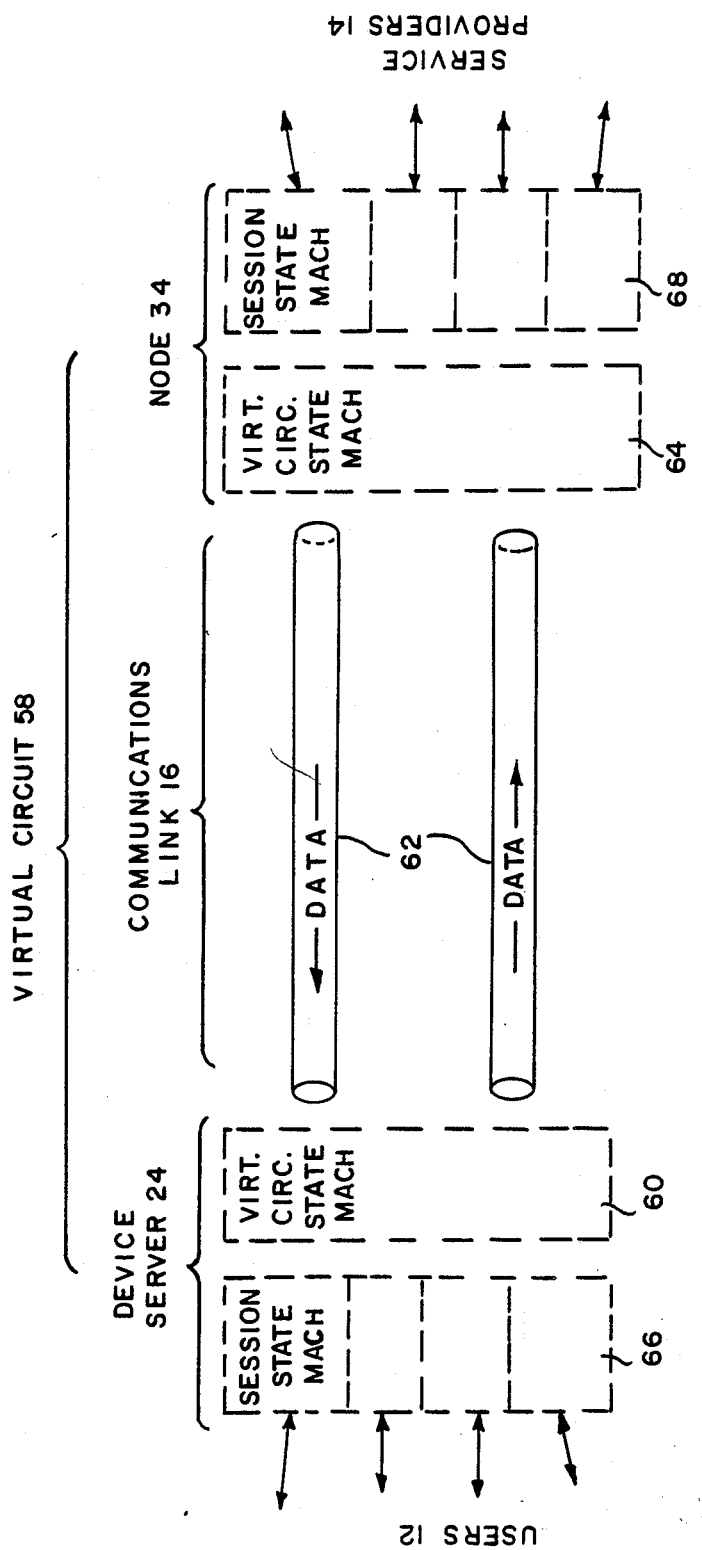
FIG. 3A is a diagram, depicting a virtual circuit and service sessions, that is useful in understanding the operations of the network depicted in FIG. 1.

When a user 12 requires a service provided by a service provider 14 identified in the service directory, the device server 24 begins to establish a virtual circuit 58 between itself and the node 34 that provides the service with the most desirable service rating. With reference to FIG. 3A, the device server 24 in a conventional manner establishes a virtual circuit state machine 60 which provides two-way data communications over a pair of unidirectional data pipes with a virtual circuit state machine 64 established by node 34. The virtual circuit state machines 60 and 64 and the data pipes 62 provide a means for transferring data, in the form of messages between the device server 24 and the node 34 over the communications link 16. It will be appreciated that message communications through a number of data pipes 62 may be multiplexed over the communications link 16, and, accordingly, the communications link provides message communcations for a number of virtual circuits in network 10.

The virtual circuit state machine 60 at the device server 24 communicates with the individual service users 12 by means of service sessions using separate session state machines 66 which the device server establishes in a conventional manner for each user. Similarly, the node's virtual state machine 64 communicates with the service providers 14 using separate session state machines 68.

The device server 24 and node 34 use messages transmitted over communication link 16 to set up the virtual circuit and the session state machines, which will be described below in connection with FIGS. 4 through 7D. In brief, however, when a user 12 requires service by a service provider 14, the device server 24 first determines whether a virtual circuit exists between it and the node 34 selected by the device server. If no such virtual circuit exists, the device server 24 transmits a virtual circuit message over communications link 16 to node 34 which causes the node to establish its virtual circuit state machine 64 to support its end of the virtual circuit 58. A session state machine 66 is also set up between its virtual circuit state machine 60 and the user 12 to allow data and other information to be accumulated from and transferred to the user.

In a succeeding virtual circuit messages, after the virtual circuit is set up, a session slot is transmitted by device server 24 to node 34 through the virtual circuit 58, specifically over the communications link 16, identifying the required service, and the node 34 sets up a session state machine 68, which connects to the service provider which provides the required service and allows data and other information to be transferred between the virtual circuit state machine and the service provider. Each session state machine collects information to be transferred from its connected user or service provider and provides the information in the form of session messages to the virtual circuit state machine. In turn, the virtual circuit state machine accumulates the session messages from various service users' or providers' state machines which are to be transferred between the same device server 24 and node 34 and forms a single virtual circuit message for transfer through the virtual circuit 58 over the communications link 16. On receiving a virtual circuit message from the virtual circuit 58, the receiving virtual circuit state machine transfers the session messages to the respective session state machines that are the intended recipients for transfer to the respective service users 12 and service providers 14, and returns a single acknowledgement message over the virtual circuit to verify receipt of the virtual circuit message. It will be appreciated that requiring only a single virtual circuit acknowledgement message for the multiplexed messages between service users and providers reduces the acknowledgement message traffic from that often required in the prior art, thereby reducing the traffic overhead over communications link 16, and also reduces the overhead required at the device server and node to generate the acknowledgement messages.

Figure 3C:
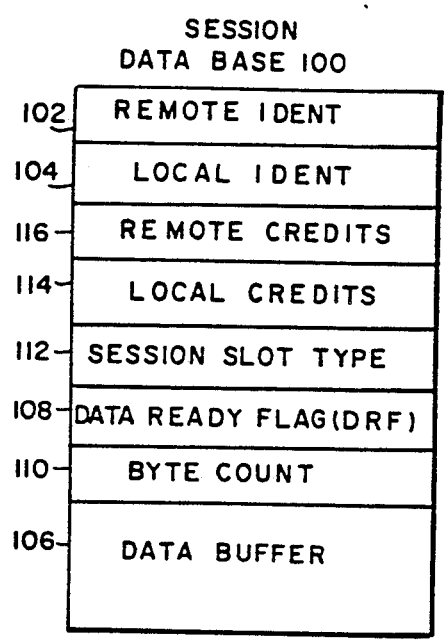
FIGS. 3B and 3C are diagrams depicting databases used by the service providers and service users in the network depicted in FIG. 1.
Figure 3B:
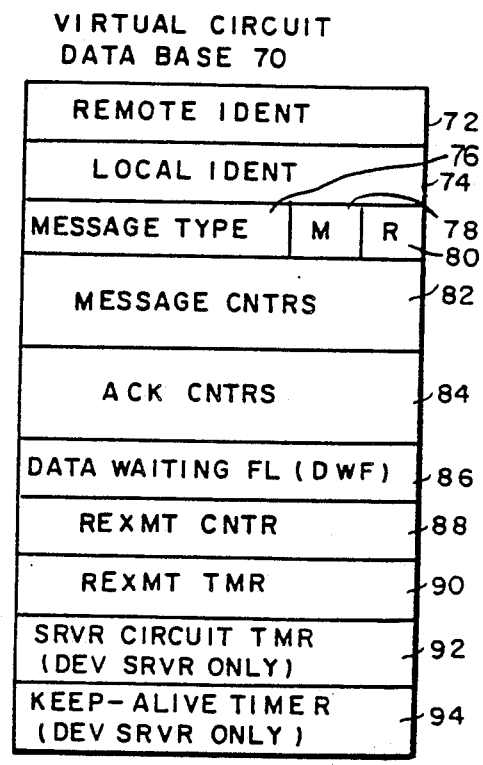

The virtual state machines 60 and 64 in device server 24 and node 34, respectively, include a data base as depicted in FIG. 3B used in transmitting and receiving messages through pipes 62. Data base 70 includes a remote identification word 72 and a local identification word 74. The identification words 72 and 74 contain the identification of the virtual circuit 58 as assigned by node 34 and device server 24. The contents of the local identification word 74 are assigned by the unit in which the data base 70 resides, and the contents of the remote identification word 72 are assigned by the other unit engaged in the virtual circuit. Thus, in the virtual circuit data base 70 which resides in device server 24, the local identification word is assigned by the device server and the remote identification word is assigned by the node 34 which provides the other end of the virtual circuit. Similarly, in the virtual circuit data base 70(FIG. 3B) residing in node 34, the contents of the local identification word 74 are assigned by the node, and the contents of the remote identification word 72 is assigned by the device server. The contents of the two identification words 72 and 74 are transmitted in the virtual circuit messages transferred through the virtual circuit over communications link to allow the device server and node to identify the messages transferred over communications link 16 as being associated with the particular virtual circuit.

The virtual circuit data base 70 also includes a message type field 76 which identifies the type of virtual circuit message to be transmitted next. Three types of virtual circuit messages are transmitted over a virtual circuit, namely, a START virtual circuit message, a RUN message, and a STOP virtual circuit message, which are detailed below in connection with FIGS. 4 and 6A through 6D.

An M field 78 identifies whether the unit including the data base 70 is a master or slave unit. In the network 10 (FIG. 1) device servers 24 are always masters and nodes 34 are always slaves; communications over a virtual circuit are always initiated by the device servers and the nodes always acknowledge or respond to the communications from the device servers.

An R field 80, when set, indicates that the last sent message requires a response.

Data base 70 also includes message counters 82 and acknowledgement counters 84. Each message transmitted by device server 24 or node 34 includes a message sequence number that is checked by the virtual circuit state machine in the receiving unit to ensure that the successive messages are properly received in sequence.

Messages are re-transmitted to ensure that they are properly received if they are not acknowledged within a predetermined time; the sequence numbers ensure that the receiving device does not treat a re-transmitted message as a new message if it, in fact, correctly received the message on a previous transmission. The contents of the message counters 82 identify the number of messages which have been transmitted and received, and the acknowledgement counters contain the message numbers of the messages which have been acknowledged. Thus, if a message number is skipped, or if acknowledgements are not received in numerical order, the device server and node can determine which messages may have not been properly transmitted over communications link 16.

A data waiting flag (DWF) 86 is set whenever any session state machine has data to send over the virtual circuit. In a device server 24, the data waiting flag is set when a message is received from a node which requires a response.

A retransmit counter 88 and retransmit timer 90 are used in retransmitting messages which have not been acknowledged within a time selected by the retransmit timer. The transmitting unit retransmits each unacknowledged message a number of times as selected by the retransmit counter 88. If the message is not acknowledged after, the retransmit counter counts out, the other end of the virtual circuit is marked out of service.

The virtual circuit data base 70 in a device server 24 also includes a server circuit timer 92. When the device server 24 transmits a message, it resets its server circuit timer 92 and is thereafter inhibited from transmitting a subsequent message until the server circuit timer times out. Thus, even if the data waiting flag 86 is set, indicating that the device server has information to transmit in a virtual circuit message, the device server is inhibited from transmitting virtual circuit messages over virtual circuit 58 until the server circuit timer times out. Conversely, even if the server circuit timer 92 has timed out, the device server 24 does not transmit any messages unless the data waiting flag 86 is set. After the server circuit timer times out, if the virtual circuit's data waiting flag 86 is thereafter set and the previously transmitted messages have been acknowledged, the device server 24 may then immediately transmit a new virtual circuit message over the virtual circuit 58. If a previously transmitted message has not been acknowledged, a device server or node waits an amount of time as specified by the retransmit timer 90 and then retransmits the unacknowledged message.

The server circuit timer 92 thus ensures at least a minimum delay period between the transmission of new virtual circuit messages by the device server 24 through any particular virtual circuit. Thus, when traffic is heavy through the virtual circuit and the data waiting flag is set before the server circuit timer times out, message transmissions will be based on the timing out of the server circuit timer 92. However, if traffic is light through the virtual circuit, the virtual circuit message transmission will be based on the setting of the data waiting flag 86. Since, with one exception as explained below, the nodes 34 only respond to or otherwise acknowledge virtual circuit messages from the device servers, the server circuit timers and the data waiting flags in the device servers also govern message traffic from the nodes through the virtual circuits. The network 10 (FIG. 1) thus achieves the benefits of both the timer-based message transfers and the event-driven message transfers, the event-driven transfers being initiated by the presence of information from user 12 for transfer over the virtual circuits, and the timer-based message transfers being based on the timing out of the server circuit timer, without having the detriments of either.

The virtual circuit data base 70 in a device server 24 also includes a keep-alive timer 94 which enables the device server to send a message over the virtual circuit if it has not sent any messages thereover for a very long period of time, to ensure that the node 34 maintains support for its end of the virtual circuit. The node 34 responds, thereby informing the device server that it also has not gone down.

As noted above, the service user and service provider providing the service required by the user communicate by means of session slots. More specifically, the session state machines at the device server and node transfer session slots which cause transitions between states in the respective session state machines and also transfer service data and status information between the service user and provider.

Each session state machine uses a session data base 100 depicted in FIG. 3C. The session data base includes a remote identification field 102 and a local identification field 104, which are used in the same way as a virtual circuit state machine uses the remote and local identification fields 72 and 74 in the virtual circuit data base 70(FIG. 3B). Specifically, each virtual circuit message that is transmitted over a virtual circuit may include session slots for different service sessions (that is, session slots intended to be used by different-session state machines in the device servers and nodes [hat communicate over the same virtual circuit) and the remote and local identification fields 102 and 104 identify the session and session state machines that are the intended recipients of the session slots. The contents of local identification field are assigned by the unit in which the data base resides, and the contents of the remote data base are assigned by the other unit.

Each session data base 100 also includes a data buffer 106 for storing data received from or to be transmitted to the service user 12 or service providers 14 associated with the particular session state machine.

When the data buffer 106 is loaded with data from the user 12 or service provider 14 connected to the particular session state machine, a data ready flag 108 is set, which in turn enables the data waiting flag 86 in the virtual circuit data base 70 to be set. When the device server or node thereafter sends a message virtual circuit, it can poll the data ready flags of the service sessions assigned to the virtual circuit to determine whether their data buffers have data to transmit, and may remove the contents of various fields, including the data from the data buffers 106 whose associated data ready flags as set, to generate session slots for transfer in a virtual circuit message.

A byte count field 110 identifies the number of bytes of data in the data buffer 106 and is sent with the data in the session slot.

A session slot type field 112 identifies the type of session slot to be sent. Five types of session messages can be sent, including START, STOP, REJECT, DATA, and STATUS messages. The contents of the session messages will be described below in connection with FIGS. 5 and 7A through 7D.

Local and remote credits fields 114 and 116 in the session data base 100 relate to the number of slots that are available, with each slot relating to a specific amount of data. Each session slot transmitted over a virtual circuit includes a credits field which identifies the amount of space available in the data buffer for any response information from the unit at the other end of the virtual circuit engaged in the service session. The contents of the credits field in the message is provided by the contents of the local credits field 114 in the session data base 100 of the unit transmitting the message. The contents of the remote credits field 116 is provided by the contents of the credits portion of the session slot received from the unit at the other end of the virtual circuit.

Figure 4:
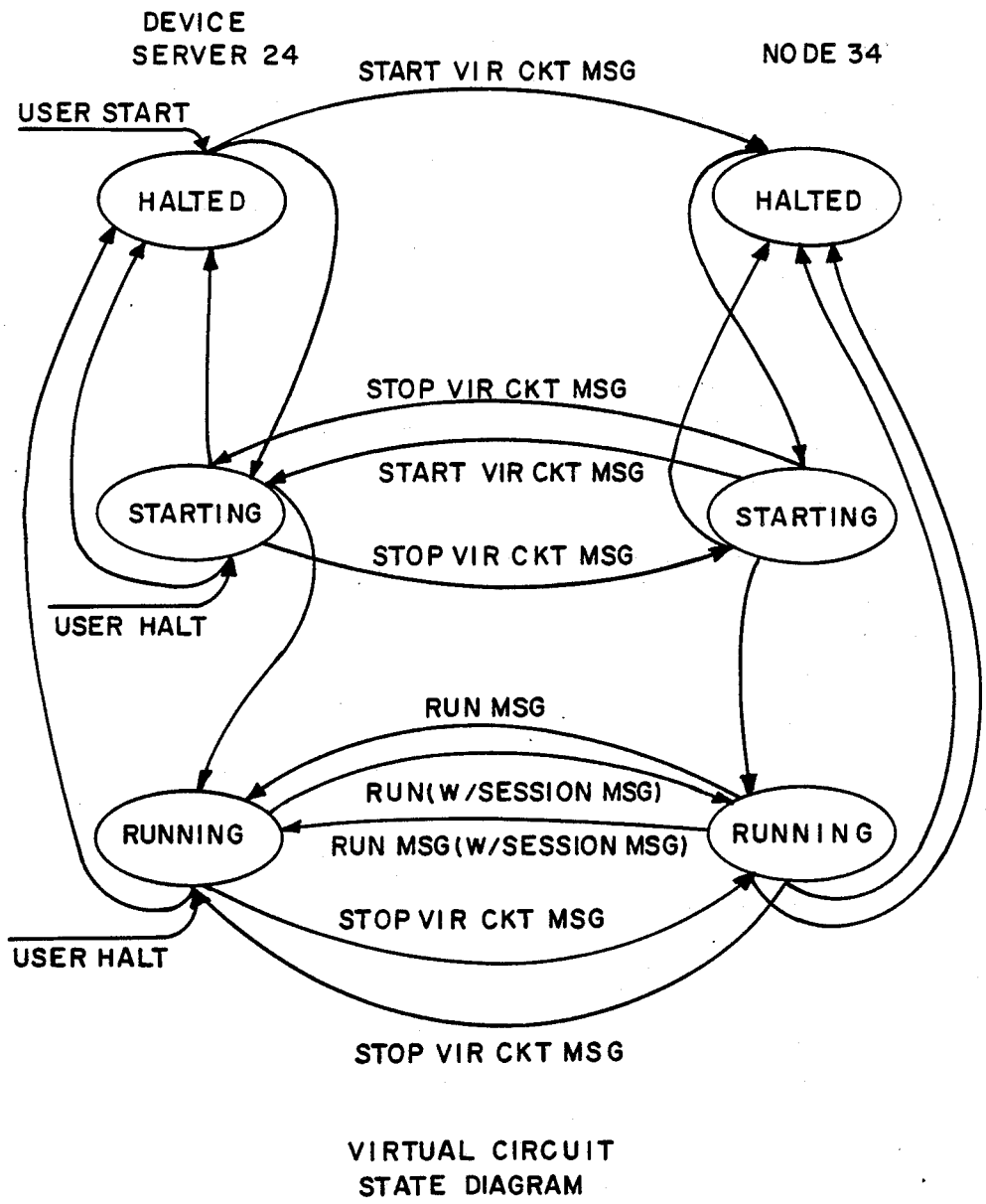
FIG. 4 is a state diagram useful in understanding the operation of the virtual circuit depicted in FIG. 3A.

FIG. 4 illustrates the various states of virtual circuit state machines 60 and 64 (FIG. 3A) and the various messages which can be transmitted over the virtual circuit during those states and which cause transitions among states. FIGS. 6A through 6D detail the contents of the various virtual circuit messages. As noted above, three types of virtual circuit messages are transmitted through the virtual circuit, including a START virtual circuit message, a STOP virtual circuit message, and a RUN message. The START and STOP virtual circuit messages are used to establish and abolish the virtual circuit, and the RUN message is used to transfer information, including session slots, between service users and providers.

With reference to FIG. 4, the state machines 60 and 64 in the device server 24 and node 34 respectively are both initially in a HALTED state. When a user 12 requires a service provided by a service provider 14 connected to a node 34, if no virtual circuit exists between the device server 24 and that node 34, the device server 24 transmits a START virtual circuit message to node 34.

Figure 6A:
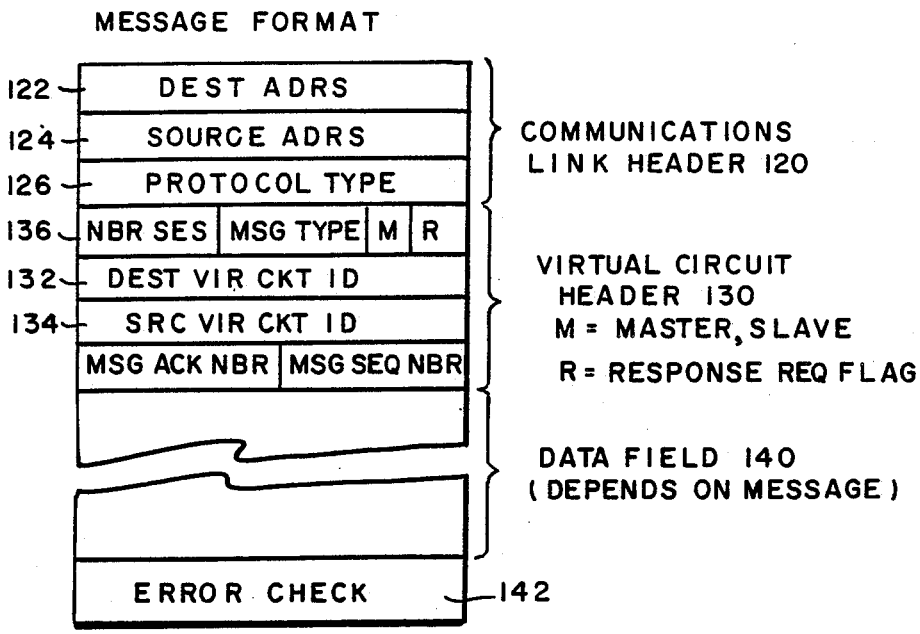
FIGS. 6A through 6D depict various formats of virtual circuit messages transmitted through the virtual circuit depicted in FIG. 3A.
Figure 6B:
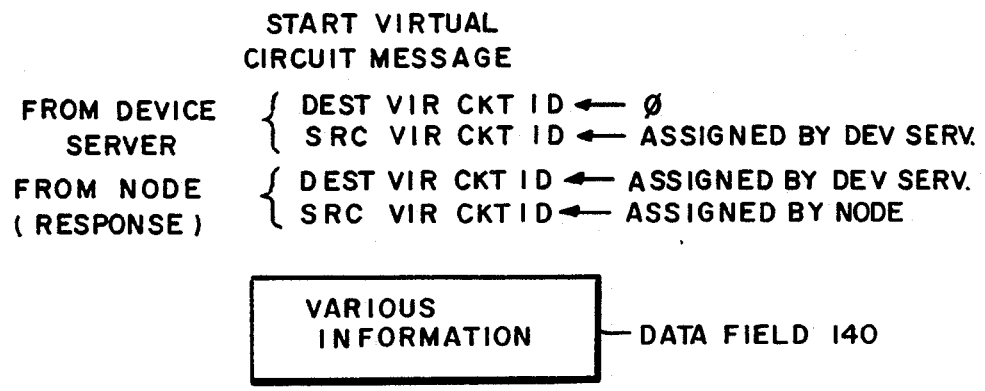
Figure 6C:
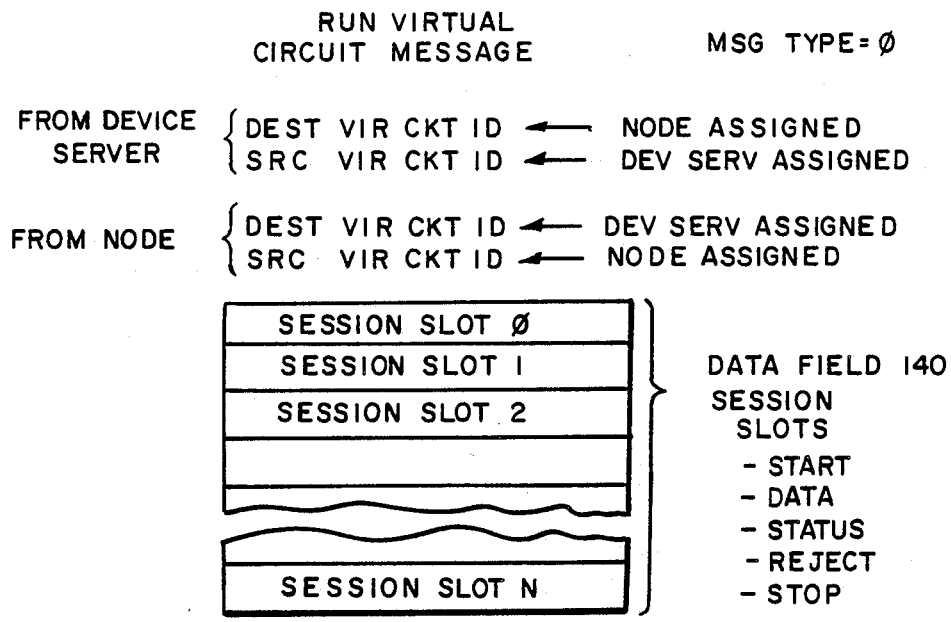

FIG. 6A depicts the general format of a virtual circuit message. With reference to FIG. 6A, the message begins with a communications link header 120, the format of which depends on the particular communiations link 16 selected for the network 10. In the specific embodiment in which the protocol of the communications link conforms to the Ethernet protocol, the communications link header includes a destination address field 122 and a source address field 124 which identify the particular sending and receiving node and device server, and a protocol type 126.

After the communications link header 120, the message includes a virtual circuit header 130 which identifies the virtual circuit over which the message is being transmitted. The virtual circuit header includes a destination virtual circuit identification field 132 and a source virtual circuit identification field 134 the contents of which are provided by the remote and local identification fields 72 and 74 in data base 70 (FIG. 3B). These fields 132 and 134 identify the virtual circuit through which the message is being transmitted. Since each receiving unit may have several virtual circuits, even between itself and the same node or device server, the fields 132 and 134 are used to identify the specific virtual circuit for which the message received over communications link 16 is intended. If the message is a START virtual circuit message from device server 24, with reference to FIG. 6B, the destination virtual circuit identification field 132 contains a "0", and the source virtual circuit identification field contains an identification that is assigned by the device server 24.

The virtual circuit header 130 also includes a message type field, an M flag and an R flag, the contents of which are provided by fields 76, 78, and 80 in the virtual circuit data base 70 (FIG. 3B). The header 30 also includes message sequence and acknowledgement sequence numbers taken from counters 82 and 84, and a field 136 which identifies the number of session slots that may be included in a data field 140. The contents of session number field 136 is used only in connection with a RUN virtual circuit message (FIG. 6C) described below. In a START virtual circuit message, the data field 140 contains information used by the recipient in setting up the virtual circuit, and in a STOP virtual circuit message (FIG. 6D) the data field contains information as to the reason the virtual circuit is being stopped.

A virtual circuit message (FIG. 6A) ends in an error check field 142 which contains a cyclic redundancy check word used to verify that the message was received without errors.

With reference again to FIG. 4, after the device server 24 transmits the START virtual circuit message, it shifts from a HALTED state to a STARTING state. Similarly, when the node 34 receives the START virtual circuit message, it shifts from a HALTED state to a STARTING state and responds with either a START virtual circuit message, indicating that it will support and participate in the virtual circuit, or a STOP virtual circuit message, indicating that it will not support the virtual circuit. In either case, the node 34 retrieves the contents of the source virutal circuit identification field 134 from the message and stores it in the remote identification field 72 in its virtual circuit data base 70 as the device server's identification of the virtual circuit.

With reference again to FIG. 6B, if the node responds with a START virtual circuit message, the node uses the contents of the source virtual circuit identification field 134 from the device server's START virtual circuit message as the contents of the destination virtual circuit field 132 in its responding START virtual circuit message. The node also provides the contents of the source virtual circuit identification field 134 (FIG. 6A) as its identification code for the virtual circuit. The device server retrieves the contents of this field, stores it in the remote identification field in its data base 70 for this virtual circuit and thereafter uses it in the destination virtual circuit identification field 132 of future messages transmitted over the virtual circuit.

Figure 6D:
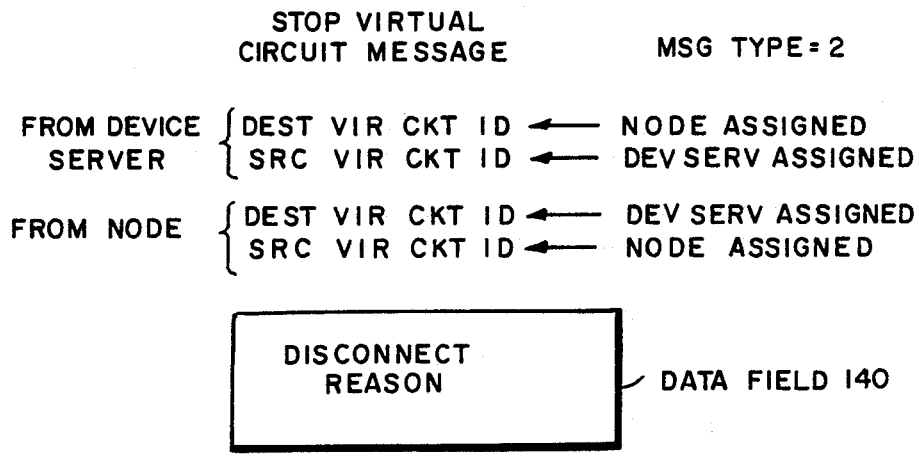

With reference to FIG. 6D, if the node responds with a STOP virtual circuit message, it also provides a source virtual circuit identification code and the data field 140 identifies the reason that the mode will not support the virtual circuit; one such reason may be that the node 34 is currently supporting other virtual circuits and has insufficient resources to provide support for another virtual circuit. If the node 34 transmits a STOP virtual circuit message to the device server, both the node and the device server return to the halted state. The device server may then attempt to establish a virtual circuit to another node connected to a service provider that provides the desired service or inform the user that the service is not available if no other node provides the service.

In addition, the user may determine, after the device server has transmitted a START virtual circuit message, that it does not need to use the particular service. This is indicated in FIG. 4 by a USER HALT directed at the STARTING state of device server 24. If that occurs, the device server transmits a STOP virtual circuit message (FIGS. 6A and 6D) to node 34. Both virtual circuit state machines 60 and 64 then return to the halted condition.

If node 34 responds with a START virtual circuit message, and if no USER HALT occurs at the device server 24 in the starting state, both the state machines 60 and 64 (FIG. 3A) shift to a RUNNING state. In this condition, the device server 24 and node 34 can transmit RUN virtual circuit messages depicted in FIGS. 6A and 6C. In this condition, the data field 140 contains session slots which are described below (FIGS. 5 and 7A through 7D). The number of session messages is identified in the session number field 136 in the virtual circuit header 130 (FIG. 6A). In the session messages, the device server 24 and node 34 transmit service information between the service users 12 and service providers 14 (FIG. 1), more specifically the service information is transmitted between service state machines 66 and 68.

When the user no longer needs a service, it disconnects from the service, and, if no other users are using the virtual circuit, a USER HALT condition exists. If the state machines 60 and 64 are both in the RUNNING state, the device server may transmit a STOP virtual circuit message (rIGS. 6A and 6D) to node 34 and return to the HALTED state.

As has been noted above,.when the virtual circuit state machines 60 and 64 are in the running state, the device server 24 and node 34 can transmit RUN virtual circuit messages which include session slots. Using the session slots, the session state machines 66 and 68 are established, and service data and status information are transmitted between the service user and provider. When the service user no longer needs the service, the session state machines may then be abolished, thereby terminating the service session. The session slots which are depicted in FIGS. 7A through 7D. By means of the session slots, the session state machines 66 and 68 shift among various states as depicted in FIG. 5.

Figure 5:
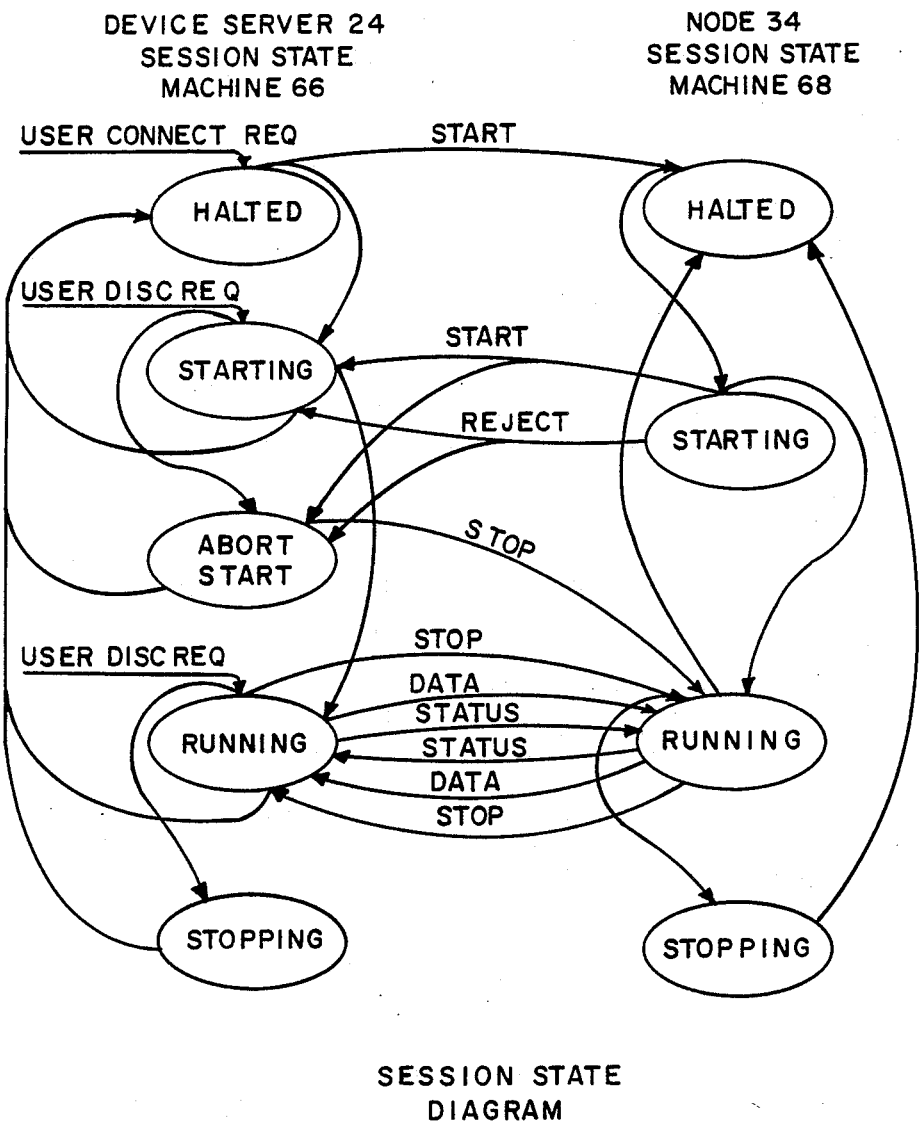
FIG. 5 is a state diagram useful in understanding the operation of the service sessions depicted in FIG. 1.

With reference to FIG. 5, the session state machine 66 of device server 24 has five states, including a HALTED state, a STARTING state, an ABORT START state, a RUNNING state, and a STOPPING state. The session state machine 68 of node 34 has four states, including a HALTED state, a STARTING state, a RUNNING state, and a STOPPING state. Initially, both state machines 66 and 68 are in a halted state, and when a user requests a particular service, the device server transmits a START session message, in a virtual circuit message through the virtual circuit.

Figure 7A:
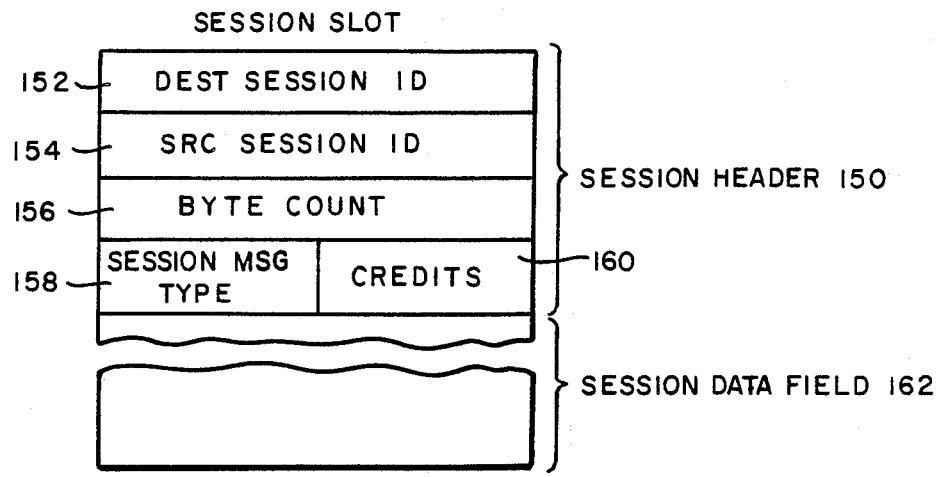
FIGS. 7A through 7D depict various formats of session slot messages transmitted between corresponding sessions in the device servers and nodes as depicted in FIG. 3A.
Figure 7B:
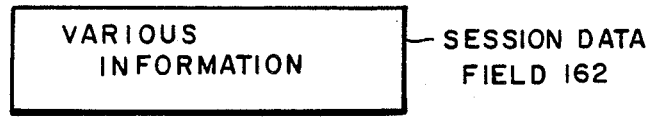

With reference to FIG. 7A, the format of a session message includes a session header 150 which includes destination session identification field 152, a source session identification field 154, a byte count field 156, a session slot type field 158, and a credits field 160. A session data field 162 carries information for establishing and abolishing a session and, as well as service session data and status information. The destination and source session identification fields 152 and 154 are used in the identical manner as the destination and source virtual circuit identification fields 122 and 124 (FIG. 6A) described above. The contents of these fields are stored in and taken from the remote and local identification fields 102 and 104 in the session data base 100 (FIG. 3C).

The contents of the byte count field 156 identify the length of the session data field 162, and are taken from the byte count field 110 in the data base 100. The contents of the session slot type field are taken from field 112 in the session data base, and identify the type of message being transmitted. As noted above, five types of session slots may be transmitted. The contents of the CREDITS field 160 are taken from the local credits field 114 in session data base 100 (FIG. 3C) to identify the number of slots that are available in the data buffer 106 for any response. When a unit receives a session slot, the contents of the CREDITS field may be stored in the remote credits field 116 of the session database 100 to indicate the amount of space in the data buffer 106 available for a subsequent session slot transfer.

In the START session slot (FIG. 7B) the session data field 162 provides information required by the session state machine at node 34 for setting up the session. Such information may include, for example, the type of service required, thereby identifying the service provider which is to engage in the service session, and size of the data buffer 106 set aside for the session in the device server.

After the device server 24 transmits the START session slot, the session state machine 66 shifts to a STARTING state. After the node receives the START message, the node's session state machine 68 shifts to the STARTING state and the node responds with either a START session slot, after which the state machine 68 shifts to the RUNNING state, or a REJECT session slot (FIG. 7D), after which the state machine shifts to the HALTED state. In either case, the node 34 supplies its session identification code in the source session identification field 154 (FIG. 7A). If the node responds with a REJECT session slot, the credits field 160 also contains the reason that it is rejecting the service session. Such reasons may include, for example, that the node is unable to provide the service because of inadequate resources, or that the node or the service provider is shutting down.

With reference again to FIG. 5, the device server 24 may receive the START session or REJECT session slot from node 34 when it is in either the STARTING state or in an ABORT START state. The device server's session state machine 66 shifts from the STARTING state to the ABORT START stage if a user disconnect request, indicating that the user does not want to use the service which it previously selected, is received from a user before either a START session or a REJECT session slot is received from node 34 . If the session state machine 66 is in the ABORT START state, and if a REJECT session slot is received, the session state machine 66 merely returns to the HALTED state. However, if a START session slot is received, the device server 24 transmits a STOP session slot over the virtual circuit to the node causing its session state machine 68 to return to the HALTED state. In either case, both session state machines 66 and 68 return to the HALTED state.

Figure 7C:
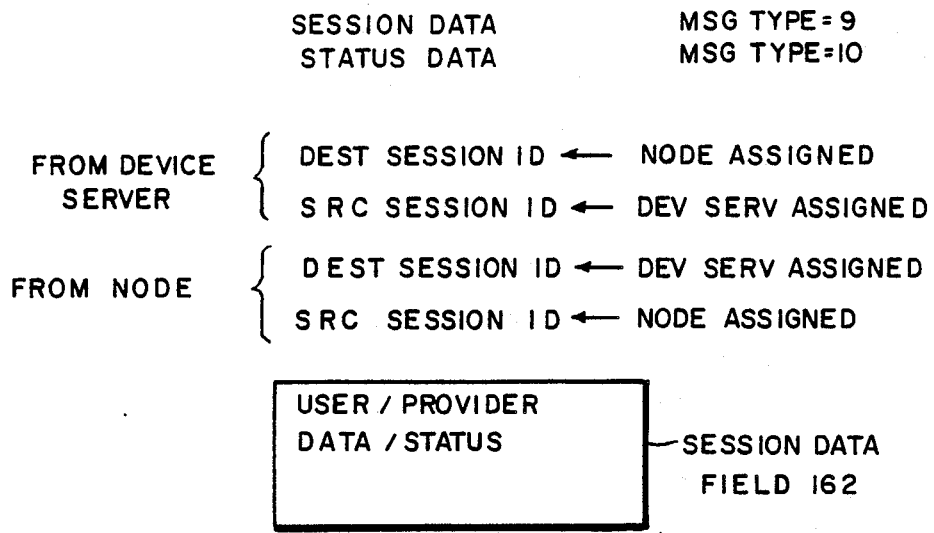
Figure 7D:
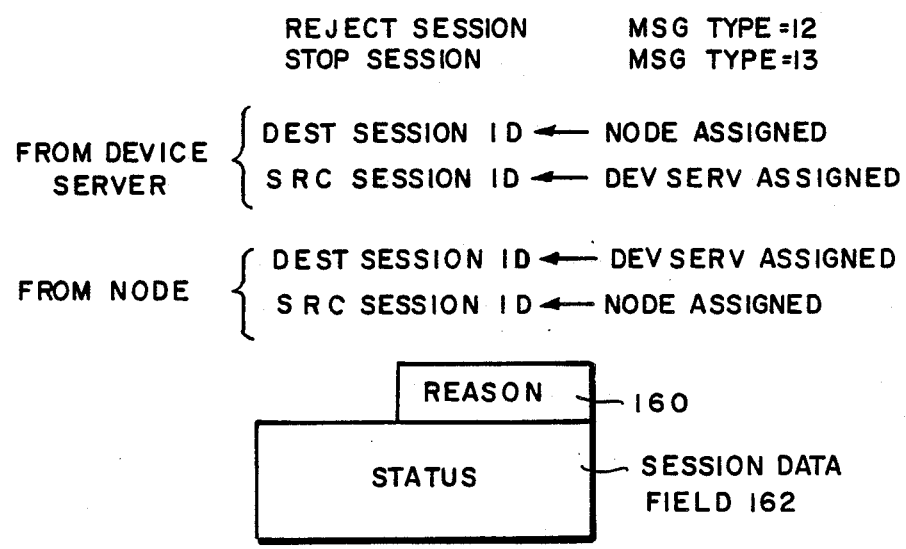

However, if the device server's session state machine 66 is in the STARTING state, and if the device server receives a START message from the node 34, its session state machine shifts to the RUNNING state. In that state, and with the node's session state machine 68 in the RUNNING state, RUN session slots including service data and status information may be transmitted back and forth between device server 24 and node 34 over the virtual circuit. With reference to FIGS. 7A and 7C, the session data field 162 in such messages contains user and service provider data and status information.

After the operator determines that it no longer requires access to the service, the user requests disconnection from the service and both state machines 66 and 68 shift to the STOPPING state and then return to the halted state.

Figure 8:
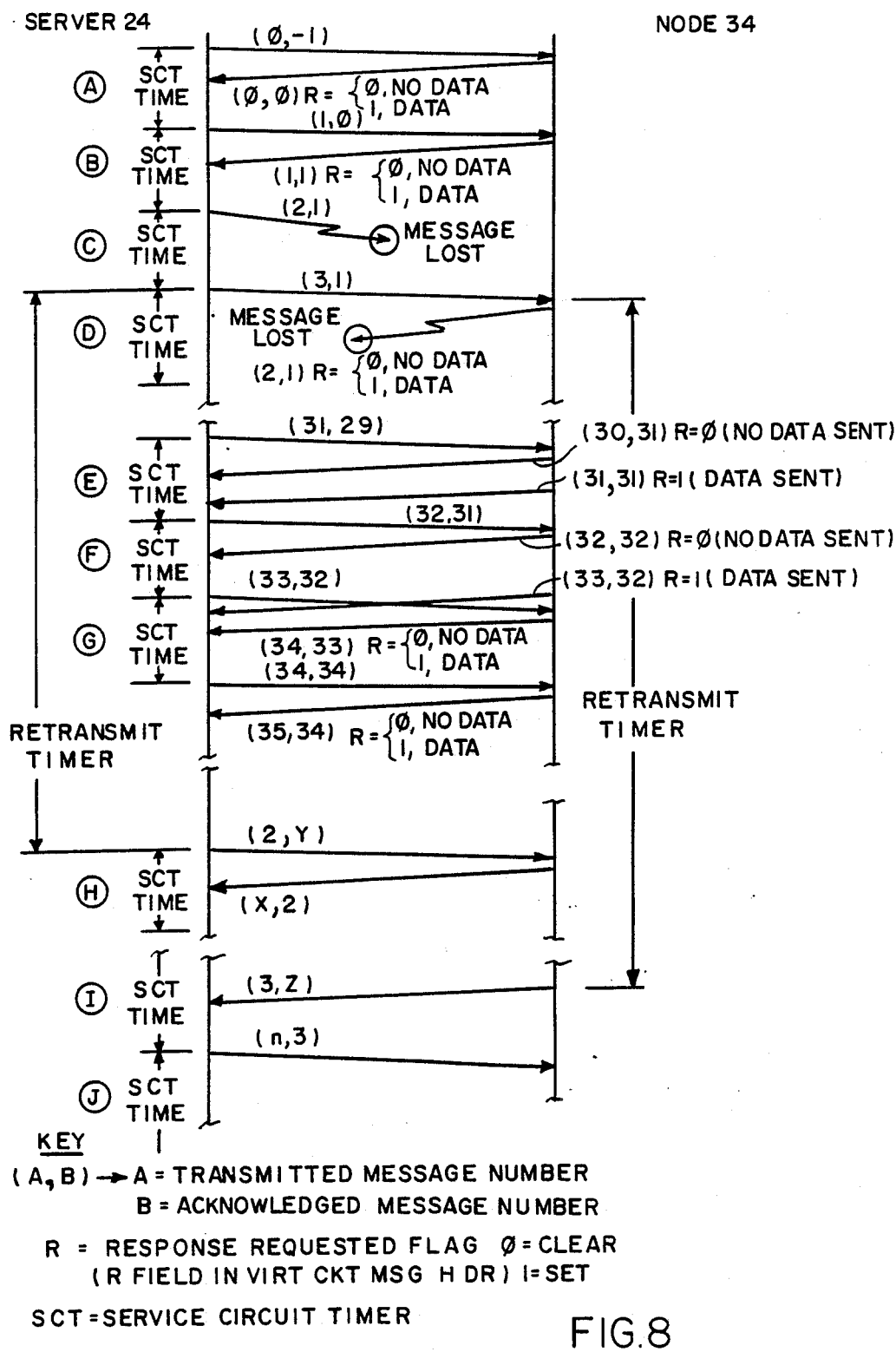
FIG. 8 depict the timings of messages transmitted through the virtual circuits as depicted in FIG. 3A.

FIG. 8. depicts the timings of various messages transmitted between a device server 24 and node 34, in response to the service circuit timer 92 and the R flag 80, the R flag in the server being set or cleared by the R field in a virtual circuit header in a message from the node. FIG. 8 also illustrates the timings of the retransmissions of various messages that are not received by the server and node, in response to the re-transmit timers 90 in each unit. Specifically, when a node receives a message from the device server, it will respond with a message having the R field being either set or clear depending on whether or not the message includes data. If the message does not include any data, the R field is clear, and the node may thereafter transmit a second message to the device server which includes data. The second message has a set R field. This is illustrated in time (E). As shown at times (F) and (G), the second message may cross with another message from the device server, which may transmit a message when its data waiting flag is set, when its service circuit timer times out. The R field being set forces the data waiting flag to be set, thereby enabling the server to send an acknowledging message to the node, whether or not it actually has data to send. The R field being clear enables the node to thereafter send another message with data, thereby removing the constraint on the node that it send messages, and therefore data, only when it receives messages from the server.

A detailed description of the operation of network 10 (FIG. 1) will now be presented. Periodically, each node 34 connected into network 10 transmits a multicast service advertising message (FIG. 2A) identifying the particular services which are available through it. All of the device servers receive the advertising message and establish a service directory (FIG. 2B) identifying the services which are available and the nodes and ratings of the services available through each node. The available services may be displayed to the operators of the service users from the device servers' directories.

When a service user 12 requires the use of a service, its device server 24 determines which node 34 provides the service and which has the highest service rating for that service. The device server 24 then determines whether it has a virtual circuit 58 between itself and that node. If no such virtual circuit exists, the device server transmit's a START virtual circuit message (FIGS. 6A and 6B) to the node to attempt to establish a virtual circuit over communications link 16. If the node response with a START virtual circuit message, the virtual circuit has been established and the device server 24 then establishes a session between the virtual circuit 58 and the user 12 requesting the service. It will be appreciated that, if a virtual circuit already exists to the required node, the device server need not set up another virtual circuit, but instead may proceed to the next steps and use the existing virtual circuit for communications. With some communications links, such as a link conforming to the Ethernet protocol, it may be desirable to limit the number of users using a single virtual circuit, since the length of each virtual circuit message is limited. Accordingly, even if a virtual circuit is already established between the device server and node, it may be desirable to establish additional virtual circuits if a maximum number of users are already using one virtual circuit.

After the virtual circuit is established, the device server 24 then may transmit virtual circuit messages through the virtual circuit including session messages multiplexed from several service sessions. A session begins with a START session slot (FIGS. 7A and 7B) transmitted to device server 24 to node 34 identifying the required service, in an attempt to establish a service session over the virtual circuit 58 with the service provider 14 which provides the required service. If the service session is established, service data and status information can be transmitted in RUN session messages.

The rate at which the device server can transmit virtual circuit messages over the communications link 16 is limited by the server circuit timer 92 (FIG. 3B) thereby allowing messages for other virtual circuits to be multiplexed over the communications link. Furthermore, the data waiting flag 86 in the respective device server inhibits it from transmitting virtual circuit messages through the virtual circuit until it has information to transmit. Thus, the device server does not transmit any messages over the virtual circuit 58 unless it has information available to be transmitted or unless it has received a message from the node in which the response requested flag has been set, and then no more often than permitted by the server circuit timer.

When a user finally determines that it no longer requires a service, the session can be abolished by device server transmitting a STOP session slot. If all of the sessions are abolished for a virtual circuit, the device server 24 may then abolish the virtual circuit by the transmission of a STOP virtual circuit message.

If additional service users 12 require services provided by a node 34, their session slots may be carried by the virtual circuit messages transmitted over virtual circuit 58. Thus, a single virtual circuit message transmitted over the virtual circuit 58 can contain messages between a number of users 12 and service providers 14. By establishing a virtual circuit between the device server 24 and node 34, and multiplexing session slots onto a single virtual circuit message, the number of acknowledgement messages may be reduced to one response message for each virtual circuit message. This reduction results in, not only a reduced amount of message traffic over the communications link since only the virtual circuit messages between nodes and device servers are acknowledged, and not the messages between particular service users and service providers. In the past, each message between service users and service providers had been acknowledged by a separate acknowledgement message, which not only increased message traffic over the communications link, but also required processing activities by the service user and service provider that are not required in the network 10 constructed in accordance with the invention.

The foregoing description has been limited to a specific embodiment of the invention. It will be apparent, however, that the invention can be practiced in networks having diverse basic construction than is disclosed in this specification, with the attainment of some or all of the advantage of the invention. Therefore, it is the object of the appended claims to cover all such variations and modifications as come within the true spirit and scope of the invention.

What is claimed as new and desired to be secured by Letters Patent of the United States is:

1. A device server unit for connection in a local area network comprising a node and a communications link for effecting transfers of messages between said device server unit and said node, said device server unit comprising a communications link message control portion comprising:
- A. a device server message interval timer for asserting a message interval timing indication at the end of a predetermined message timing interval;
- B. a device server message counter for generating a message identification value identifying a message sent by the device server;
- C. a device server data store for accumulating data from said server user for transmission over said communications link;
- D. a device server data waiting indicator having a set condition when data is stored in said data store and a reset condition; and
- E. a device server message acknowledgement counter for generating a message acknowledgement value identifying a message which is being acknowledged;
- F. a device server retry timer for generating a device server retry indication at the end of a predetermined device server retry timing interval longer than said message timing interval;
- G. a device server keep alive timer for generating a keep alive timing indication at the end of a predetermined keep alive timing interval longer than said message timing interval;
- H. a device server message receiver for (I) receiving messages from said communications link, (II) modifying the message acknowledgement value generated by said device server message acknowledgement counter in response to the contents of a message acknowledgement field in a message from said node, (III) disabling said device server retry timer in response to a device server message being acknowledged, and (IV) setting said device server data waiting indicator in response to a response requested indicator field in a message from said node having a predetermined value;
- I. a device server message generator for generating a message with a message data field containing data from said data store, a message identification field containing said message identification value and a message acknowledgement field containing said message acknowledgement value, in response to (I) the coincidence of said data waiting indicator having a set condition and said message interval timer generating the message interval timing indication, (II) the generation of a device server retry indication by said device server retry timer, and (III) the generation of a keep alive timing indication by said keep alive timer; and
- J. a device server message transmitter for transmitting messages generated by said device server message generator over the communications link.

2. A method of operating a device server unit to facilitate communications in a local area network, the local area network comprising a node connected to a service provider and a communications link to effect transfers of messages between said node and said device server unit to facilitate communications between a service user and said service provider, said method comprising the steps of:

- A. accumulating data from said service user in a data store in said device server for transmission to said device provider;
- B. conditioning a data waiting indicator having a set condition and a clear condition to said set condition to indicate the presence of data accumulated in said data store;
- C. asserting a timing indication at the end of a predetermined timing interval;
- D. providing a message-identification value that identifies each message;
- E. generating a message comprising data from said data store in response to the coincidence of the data waiting indicator having a set condition and the assertion of the timing indication, said message including said message-identification value, and thereafter incrementing said message-identification value;
- F. transmitting generated messages over the communications link; and
- G. setting said data waiting indicator in response to a response requested indicator of a message received from said node having a predetermined value.

3. A server for connection to a communications link in a local network including a node, said server including:
- a. timing means for performing a timing operation to asset a timing signal at the end of a predetermined timing interval;
- b. data storage means for storing data in transmission to said node;
- c. data waiting flag means having a set condition and a clear condition;
- d. server message transmission means for generating server messages for transmission over the communications link, each said server message being generated only when said timing signal is asserted and the data waiting flag means is in said set condition;
- e. server message receiving means for connection to said communications link for receiving node messages; and
- f. data waiting flat condition establishment means connected to said data storage means for setting said data waiting flag means in response to said data storage means containing data to be transmitted; and,
- g. data waiting flag condition establishment means connected to said data storage means for setting said data waiting flag means in response to receipt by said server message receiving means of a node message in which a response requested flag has a set condition.

4. A server as defined in claim 3 wherein said server further comprises:
each said server message including a server message identification field, said server message transmission means including a server message counter means for providing a server message identification value that identifies each server message, said server message transmission means further including means connected to said server message counter means for transmitting said server message identification value in said message identification field and for incrementing said message counter means.

5. A server as defined in claim 4 wherein each said server message further comprises:

an acknowledgement number field, said server further including a node message acknowledgement means for enabling said server message transmission means to transmit, in the server message, a value identifying the last node message received by said server message receiving means.

6. A server as defined in claim 5 further comprising:
wherein each server message further having a recipient address field for identifying the server as the intended recipient, said server message transmission means further having means for transmitting in the address field of a server message the address of said server; and,
said server message receiving means selectively receiving said node message in response to a determination of whether a corresponding address field of said node message contains the address of said server.

7. A server for connection to a communications link in a local area network including a node, said server including:
a. timing means for performing a timing operation to assert a timing signal at the end of a predetermined timing interval;
b. data storage means for storing data for transmission to said node;
c. data waiting flag means having a set condition and a clear condition;
d. server message transmission means for generating server messages for transmission over the communications link, each said server message being generated only when said timing signal is asserted and the data waiting flag means is in said set condition;
e. server message receiving means for connection to said communications link for receiving node message; and
f. data waiting flag condition establishment means, connected to said data storage means for setting said data waiting flag means in response to said data storage means, containing data to be transmitted; and,
g. data waiting flag condition establishment means, connected to said data storage means for setting said data waiting flag means in response to receipt by said server message receiving means of a node message in which a response requested flag has a set condition,
whereby said data waiting flag is set either by receipt of data to be transmitted or by receipt of a node message having a response requested flag set.

8. A server as defined in claim 7 wherein said server further comprises:
each said server message including a server message identification field, said server message transmission means including a server message counter means for providing a server message identification value that identifies each server message, said server message transmission means further including means connected to said server message counter means for transmitting said server message identification value in said server message identification field and for incrementing said message counter means.

9. A server as defined in claim 8 wherein each said server message further comprises: an acknowledgement number field, said server further including a node message acknowledgement means for enabling said server message transmission means to transmit, in the server message, a value identifying the last node message received by said server message receiving means.

10. A server as defined in claim 9 wherein each server is identified by an address, each server message further including a recipient address field for identifying the server or node as the intended recipient, said server message transmission means further including means for transmitting in the address field of a server message the address of said server; and,
said server message receiving means selectively receiving said node message in response to a determination of whether a corresponding address field of said node message contains the address of said server.

11. A method of generating messages from a server for transmission over a communications link in a local area network including a server and a node, comprising performing the following steps in the server:
a. asserting a timing signal at the end of a predetermined timing interval;
b. storing data for transmission to said node in a data store;
c. providing a data waiting flag having a set condition and a clear condition;
d. generating server messages for transmission over the communications link only when said timing signal is asserted and the data waiting flag is in said set condition;
e. receiving said node messages; and
f. setting said data waiting flag in response to said data store containing data to be transmitted; and,
g. setting said data waiting flag in response to receipt by said server of a node message in which a response requested flag has said set condition.

12. The method as defined in claim 11 further comprising:
wherein each said server message includes a server message identification field, providing a server message identification value via a message counter that identifies each server message, transmitting said server message identification value in said server message identification field and incrementing said message counter.

13. The method as defined in claim 12 further comprising:
wherein each said server message further includes an acknowledgement number field, transmitting, in the server message acknowledgement number field, a value identifying the last node message received by said server message receiving means.

14. The method as defined in claim 13 further comprising:
wherein said server is identified by an address, each server message further including a recipient address field for identifying the server or node as the intended recipient, transmitting in the address field of a server message the address of said server; and,
selectively receiving said node message in response to a determination of whether a corresponding address field of said node message contains the address of said server.

15. A device server for communicating between a user terminal and a node, said device server comprising:
timing means in said device server for indicating a passage of a predetermined time interval;
storage means in said device server for storing data transmitted to said device server by said user terminal;

node message receiving means for said device server to receive message transmitted by said node, said node messages being of either a first type requiring an acknowledgment or being of a second type not requiring an acknowledgement;

transmission means, in response to said device server receiving said data from said user terminal OR in response to said device server receiving a node message of said first type requiring an acknowledgment from said node, for said device server to send a server message for receipt by said node after an expiration of said predetermined time interval, and said server message containing data stored in said storage means if there is any data stored to send and said server message acknowledging said node message and containing no data if there is not data to send, whereby said timing means regulates both said device server sending data from said user to said node and regulates said device server sending an acknowledgment message to said node in response to receipt of a message from said node.

16. The device server as in claim 15 wherein said transmission means for said device server to send a server message for receipt by said node after expiration of said predetermined time interval, further comprising:

means, responsive to the passage of a predetermined time interval wherein neither data transmitted by said user terminal is received nor a node message of said type requiring a response is received by said device server, for sending said server message immediately upon receipt of data from said user terminal.

17. The device server as in claim 15 wherein said transmission means for said device server to send a server message for receipt by said node after an expiration of said predetermined time interval, further comprises:

means, responsive to the passage of a predetermined time interval wherein neither data transmitted by said user terminal is received nor a node message of said first type requiring a response is received by said device server, for sending said server message after expiration of a subsequent predetermined time interval after receipt of said data from said user terminal.

18. The device server as in claim 15 wherein said node message of a first type requiring an acknowledgment, further comprises:

means for indicating that a response is requested.

19. The device server as in claim 18 wherein said means for indicating that a response is requested further comprises a response requested and flag field means in said node message.

20. The device server as in claim 19 wherein said response requested flag field means further comprises a bit in a header of said node message, said bit having either a set condition or a clear condition, said set condition indicating that a previously sent node message requires an acknowledgment from said device server.

21. The device server as in claim 15 wherein said node message of a first type requiring an acknowledgment, further comprises: a node message containing data.

22. The device server as in claim 15 wherein said node message of a second type not requiring an acknowledgment, further comprises: a node message containing no data.

* * * * *